(12) United States Patent
Hwang et al.

(10) Patent No.: US 9,746,948 B2
(45) Date of Patent: Aug. 29, 2017

(54) MOBILE TERMINAL AND CONTROL METHOD THEREOF

(71) Applicant: LG ELECTRONICS INC., Seoul (KR)

(72) Inventors: Keumsung Hwang, Seoul (KR); Miyoung Kim, Pocheon (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 13/975,849

(22) Filed: Aug. 26, 2013

(65) Prior Publication Data
US 2014/0062926 A1 Mar. 6, 2014

(30) Foreign Application Priority Data
Sep. 4, 2012 (KR) .................. 10-2012-0097910

(51) Int. Cl.
*G06F 3/041* (2006.01)
*H04W 4/20* (2009.01)

(52) U.S. Cl.
CPC .......... *G06F 3/0412* (2013.01); *H04W 4/206* (2013.01)

(58) Field of Classification Search
CPC .... H04M 1/7253; G06F 3/041; G06F 3/0412; G06F 3/0414; G06F 3/0416; H04W 4/206
USPC .......................................... 345/173; 709/217
See application file for complete search history.

(56) References Cited

U.S. PATENT DOCUMENTS

| | | | |
|---|---|---|---|
| 2005/0037787 A1* | 2/2005 | Bachner et al. | 455/502 |
| 2008/0009311 A1* | 1/2008 | Nam et al. | 455/550.1 |
| 2008/0180401 A1* | 7/2008 | Khedouri | G06F 17/30094 345/173 |
| 2012/0131098 A1* | 5/2012 | Wood et al. | 709/203 |
| 2012/0178431 A1* | 7/2012 | Gold | 455/420 |
| 2012/0246267 A1* | 9/2012 | Mallet et al. | 709/217 |
| 2012/0271910 A1* | 10/2012 | Huh | H04M 1/7253 709/217 |

FOREIGN PATENT DOCUMENTS

WO WO 2004/075169 A3 9/2004

OTHER PUBLICATIONS

European Search Report dated Jan. 23, 2014, issued in Application No. 13 18 2953.

* cited by examiner

*Primary Examiner* — Dmitriy Bolotin
(74) *Attorney, Agent, or Firm* — KED & Associates LLP

(57) ABSTRACT

A mobile terminal may include a display unit to display a sharing history list while the mobile terminal is executing a management application for managing contents sharing between the mobile terminal and at least one of a plurality of external devices, the displayed sharing history list including a plurality of sharing history items. The mobile terminal may also include a controller to determine, in response to a user input with respect to the sharing history items, connection environment information, a target device, and shared contents each corresponding to the sharing history items on the sharing history list, the controller to connect the mobile terminal to the target device based on the connection environment information, and the controller to play the shared contents such that the shared contents is output by at least one of the target device or the display unit of the mobile terminal.

20 Claims, 13 Drawing Sheets

MOBILE TERMINAL AND CONTROL METHOD THEREOF

CROSS-REFERENCE TO RELATED APPLICATION

This application claims the benefit of an earlier filing date and a right of priority from Korean Application No. 10-2012-0097910, filed Sep. 4, 2012, the subject matter of which is incorporated herein by reference.

BACKGROUND

1. Field

The present disclosure may relate to a mobile terminal, and more particularly, to a mobile terminal that interworks with a plurality of external devices and a control method thereof.

2. Background

A terminal may be classified as a mobile (portable) terminal or a stationary terminal. The mobile terminal may be also classified as a handheld terminal or a vehicle mount terminal.

The terminal may support more complicated functions such as capturing images or video, reproducing music or video files, playing games, receiving broadcast signals, and/or the like. The mobile terminal may be embodied in the form of a multimedia player or a device.

Attempts have been made to implement complicated functions in such a multimedia device using hardware and/or software.

As an example of such efforts, N screen technology may be applied to the mobile terminal that interworks with an external device. The N screen technology may indicate a service or technology through which a single multimedia content may be consecutively appreciated by a plurality of electronic devices (e.g., digital TV, tablet PC, smart phone, etc.).

BRIEF DESCRIPTION OF THE DRAWINGS

Arrangements and embodiments may be described in detail with reference to the following drawings in which like reference numerals refer to like elements and wherein.

DETAILED DESCRIPTION

Description may now be provided in detail of exemplary arrangements and/or embodiments, with reference to accompanying drawings. For ease of description with reference to the drawings, same or equivalent components may be provided with same reference numbers, and a description thereof may not be repeated.

A mobile terminal (or electronic device) may be a portable phone, a smart phone, a laptop computer, a digital broadcasting terminal, a Personal Digital Assistant (PDA), a Portable Multimedia Player (PMP), a navigation system, etc. However, embodiments may also be applicable to a fixed terminal, such as a digital TV, a tablet and/or a desktop computer, except for specific configurations for mobility.

Figure 1:
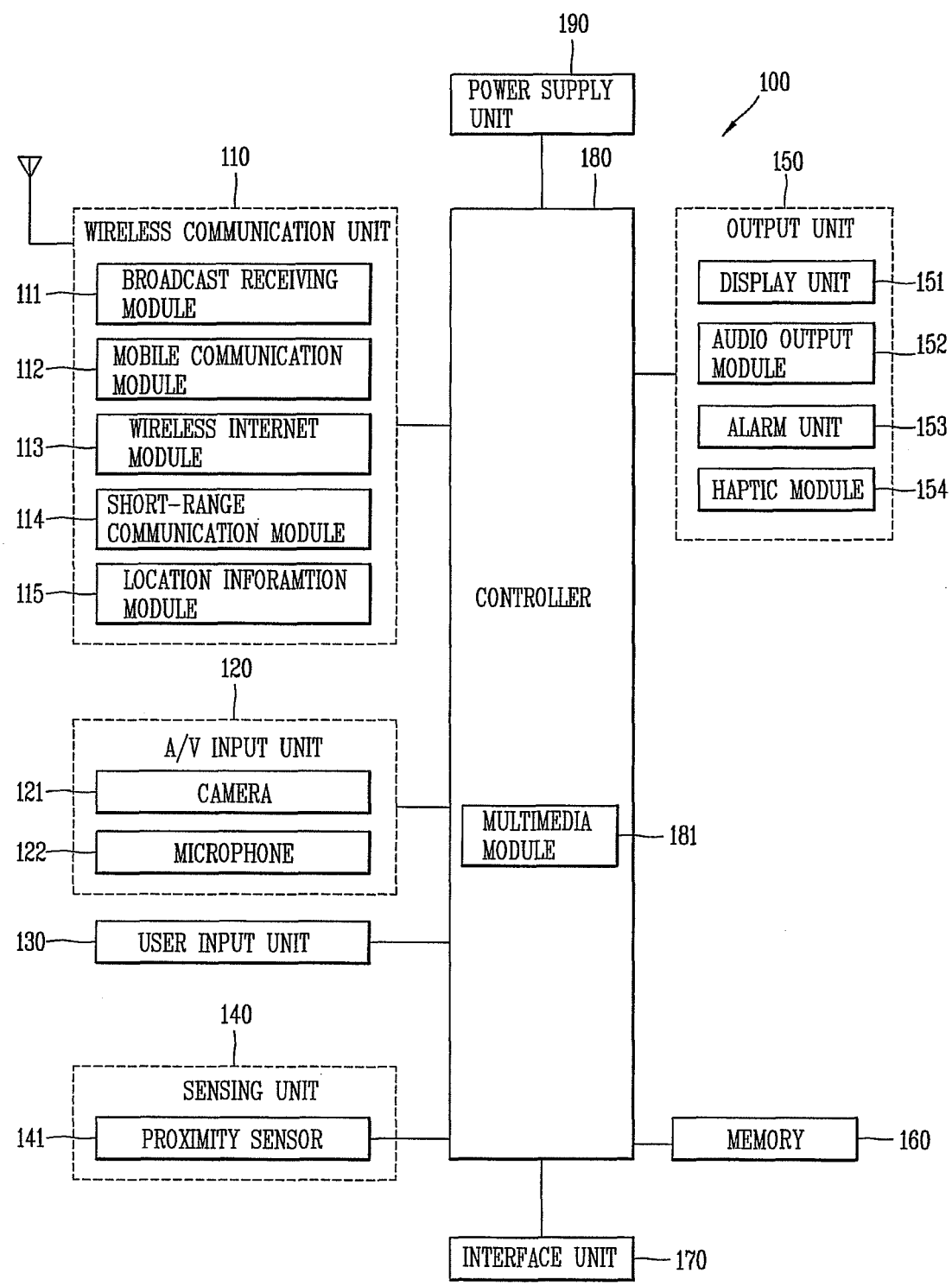
FIG. 1 is a block diagram showing a mobile terminal.

FIG. 1 is a block diagram of a mobile terminal or electronic device. Other arrangements and configurations may also be provided.

FIG. 1 shows that a mobile terminal 100 may include a wireless communication unit 110 (or radio communication unit), an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, although it should be understood that implementing all of the illustrated components is not a requirement. The mobile terminal 100 may be implemented by greater or fewer components.

The wireless communication unit 110 may include one or more components to authorize wireless (or radio) communication between the mobile terminal 100 and a wireless communication unit system or a network in which the mobile terminal 100 is located. For example, the radio communication unit 110 may include a broadcast receiving module 111, a mobile communication module 112, a wireless Internet module 113, a short range communication module 114 and a location information module 115.

The broadcast receiving module 111 may receive broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network. The broadcast associated information may be received by the mobile communication module 112. Broadcast signals and/or broadcast-associated information received via the broadcast receiving module 111 may be stored in the memory 160.

The mobile communication module 112 may transmit and/or receive wireless or radio signals to and/or from at least one of a base station, an external terminal and a server on a mobile communication network. The wireless or radio signals may include a voice call signal, a video call signal or various types of data according to text and/or multimedia message transmission and/or reception.

The wireless Internet module 113 may support wireless Internet access for the mobile terminal 100. This module may be internally or externally coupled to the mobile terminal 100. As the wireless Internet technique, a wireless local area network (WLAN), Wi-Fi, wireless broadband (WiBro), world interoperability for microwave access (Wi-MAX), high speed downlink packet access (HSDPA), and/or the like may be used.

The short range communication module 114 may be a module for supporting short range communications. Examples of short range communication technology include Bluetooth™, Radio Frequency IDentification (RFID), Infrared Data Association (IrDA), Ultra-WideBand (UWB), Zig-Bee™, and/or the like.

The location information module 115 may be a module for acquiring a location (or position) of the mobile terminal 100. For example, the location information module 115 may include a GPS (Global Positioning System) module.

Referring to FIG. 1, the NV input unit 120 may be configured to receive an audio or video signal. The A/V input unit 120 may include a camera 121 and a microphone 122. The camera 121 may process image data of still pictures or video acquired by an image capture device in a video capturing mode or an image capturing mode. The processed image frames may be displayed on a display unit 151. The image frames processed by the camera 121 may be stored in the memory 160 or may be transmitted via the wireless communication unit 110. Two or more cameras 121 may be provided according to configuration of the mobile terminal 100.

The microphone 122 may receive sounds (audible data) via a microphone in a phone call mode, a recording mode, a voice recognition mode, and/or the like, and the microphone 122 may process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile terminal 100. The user input unit 130 may allow the user to enter various types of information. The user input unit 130 may include a keypad, a dome switch, a touch pad (e.g., a touch sensitive member that detects changes in resistance, pressure, capacitance, etc. due to being contacted), a jog wheel, a jog switch, and/or the like.

The sensing unit 140 may detect (or determine) a current status (or state) of the mobile terminal 100 such as an opened state or a closed state of the mobile terminal 100, a location of the mobile terminal 100, presence or absence of a user's touch (contact) with the mobile terminal 100 (e.g., touch inputs), orientation of the mobile terminal 100, an acceleration or deceleration motion and direction of the mobile terminal 100, etc., and the sensing unit 140 may generate commands or signals for controlling operation of the mobile terminal 100. For example, when the mobile terminal 100 is implemented as a slide type mobile phone, the sensing unit 140 may sense whether the slide phone is opened or closed. The sensing unit 140 can detect whether (or not) the power supply unit 190 supplies power or whether (or not) the interface unit 170 is coupled with an external device.

The sensing unit 140 may include a proximity sensor 141. The sensing unit 140 may include a touch sensor configured to sense a touch operation with respect to the display unit 151. The touch sensor may be implemented as a touch film, a touch sheet, a touch pad, etc. The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure.

If the display unit 151 and the touch sensor have a layered structure therebetween, the display unit 151 may be used as an input device rather than an output device. Such display unit 151 may be referred to as a touch screen.

When touch inputs are sensed by the touch sensor, corresponding signals may be transmitted to a touch controller. The touch controller may process the received signals, and then transmit corresponding data to the controller 180. Accordingly, the controller 180 may sense which region of the display unit 151 has been touched.

When the touch screen is implemented as a capacitance type, proximity of a pointer to the touch screen may be sensed by changes of an electromagnetic field. In this case, the touch screen may be categorized as a proximity sensor 141.

The proximity sensor 141 may include a sensor to sense presence or absence of an object approaching to a surface to be sensed, and/or an object disposed near a surface to be sensed, by using an electromagnetic field or infrared rays without a mechanical contact. The proximity sensor 141 may have a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, and/or so on.

In the following description, for the sake of brevity, recognition of the pointer positioned to be close to the touch screen without being contacted may be called a proximity touch, while recognition of actual contacting of the pointer on the touch screen may be called a contact touch.

The proximity sensor 141 may detect a proximity touch and a proximity touch pattern (e.g., a proximity touch distance, a proximity touch speed, a proximity touch time, a proximity touch position, a proximity touch motion state, or the like). Information corresponding to the sensed proximity touch operation and the proximity touch pattern may be output to the touch screen.

The output unit 150 may provide outputs in a visual, audible, and/or tactile manner. The output unit 150 may include the display unit 151, an audio output module 152, an alarm unit 153 and a haptic module 154.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or an image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and/or an e-ink display.

Some of these displays may be transparent so that outside may be seen therethrough, which may be referred to as a transparent display. An example of a transparent display may include a transparent organic light emitting diode (TOLED), etc. The mobile terminal 100 may include two or more display units 151. The rear surface portion of the display unit 151 may also be implemented to be optically transparent.

Under this configuration, a user can view an object positioned at a rear side of a body through a region occupied by the display unit 151 of the body.

The display unit 151 may be implemented as two or more in number according to a configured aspect of the mobile terminal 100. For example, a plurality of displays may be arranged on one surface integrally or separately, and/or may be arranged on different surfaces.

The audio output module 152 may output audio data received from the wireless communication unit 110 or stored in the memory 160 in a call signal reception mode, a call mode, a record mode, a voice recognition mode, a broadcast reception mode, and/or the like. The audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 may output a signal for informing about an occurrence of an event of the mobile terminal 100. Events generated in the mobile terminal 100 may include call signal reception, message reception, key signal inputs, touch inputs, and/or the like. In addition to video or audio signals, the alarm unit 153 may output signals in a different manner, for example, to inform about an occurrence of an event. The video signal or the audio signal may be output through the display unit 151 and/or the audio output module 152. Therefore, the display unit 151 and the audio output module 152 may be categorized as part of the alarm unit 153.

The haptic module 154 may generate various tactile effects that the user may feel. An example of the tactile effects generated by the haptic module 154 is vibration. Strength and pattern of the haptic module 154 may be controlled. For example, different vibrations may be combined to be output or to be sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to configuration of the mobile terminal 100.

The memory 160 may store software program(s) used for processing and controlling operations performed by the controller 180, and/or may temporarily store data (e.g., a map data, phonebook, messages, still images, video, etc.) that are input or output. The memory 160 may store data relating to various patterns of vibrations and sounds output when a touch input to the touch screen is sensed.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. The mobile terminal 100 may be operated in relation to a web storage device that performs a storage function of the memory 160 over the Internet.

The interface unit 170 may serve as an interface with every external device connected with the mobile terminal 100. For example, the external devices may transmit data to an external device, receive and transmit power to each element of the mobile terminal 100, and/or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, and/or the like.

The identification module may be a chip that stores various information for authenticating authority of using the mobile terminal 100 and may include a user identity module (UIM), a subscriber identity module (SIM) a universal subscriber identity module (USIM), and/or the like. The device having the identification module (hereinafter referred to as an identifying device) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 and/or may serve as a passage to allow various command signals input by the user from the cradle to be transferred to the mobile terminal 100 therethrough. Various command signals or power input from the cradle may operate as signals for recognizing that the mobile terminal is properly mounted on the cradle.

The controller 180 may control operations of the mobile terminal 100. For example, the controller 180 may perform controlling and processing associated with voice calls, data communications, video calls, and/or the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 may receive external power or internal power and may supply appropriate power required for operating respective elements and components under control of the controller 180.

Various arrangements and embodiments described herein may be implemented in a computer-readable or its similar medium using, for example, software, hardware, and/or any combination thereof.

For hardware implementation, embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform functions described herein. In some cases, such arrangements and embodiments may be implemented by the controller 180 itself.

For software implementation, embodiments such as procedures or functions described herein may be implemented by separate software modules. Each software module may perform one or more functions or operations described herein. Software codes may be implemented by a software application written in any suitable programming language. The software codes may be stored in the memory 160 and executed by the controller 180.

The user input unit 130 may be manipulated to receive a command for controlling operation of the mobile terminal 100. The user input unit 130 may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as characters, numbers, symbols, graphics and/or icons. Alternatively, such information may be implemented as 3D stereoscopic images. For input of the information, at least one of characters, numbers, graphics and/or icons may be arranged and displayed in a preset configuration, thus being implemented in the form of a keypad. Such a keypad may include soft keys.

The display unit 151 may operate as a single entire region or by being divided into a plurality of regions. For the latter, the plurality of regions may cooperate with one another. For example, an output window and an input window may be displayed at upper and lower portions of the display unit 151, respectively. The output window and the input window may be configured to output and input information, respectively. Soft keys representing numbers for inputting telephone numbers or the like may be output on the input window. Once a soft key is touched, a number or the like corresponding to the touched soft key may be displayed to the output window. Upon manipulating of the manipulation unit, a call connection for a telephone number displayed on the output window may be attempted, and/or a text output on the output window may be input to an application.

The display unit 151 or the touch pad may be configured to sense a touch scroll. A user may scroll the display unit 151 or the touch pad to move a cursor or a pointer positioned on an object displayed on the display unit 151 (e.g., an icon). In one example of moving a finger on the display unit 151 or the touch pad, a path of the finger being moved may be visibly displayed on the display unit 151, which may be useful upon editing an image displayed on the display unit 151.

One function of the mobile terminal 100 may be executed in correspondence with an example where the display unit 151 and the touch pad are touched together within a preset time. An example of being touched together may include clamping a terminal body with the user's thumb and index fingers. The one function, for example, may be activating or deactivating the display unit 151 or the touch pad.

Figure 2A:
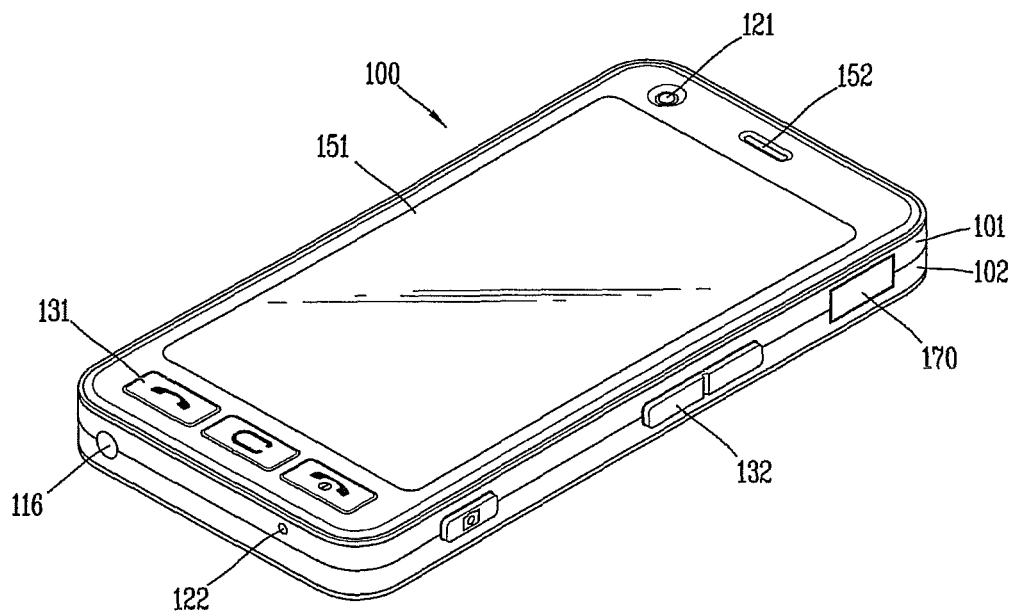
FIGS. 2A and 2B are perspective views showing an appearance of a mobile terminal.
Figure 2B:
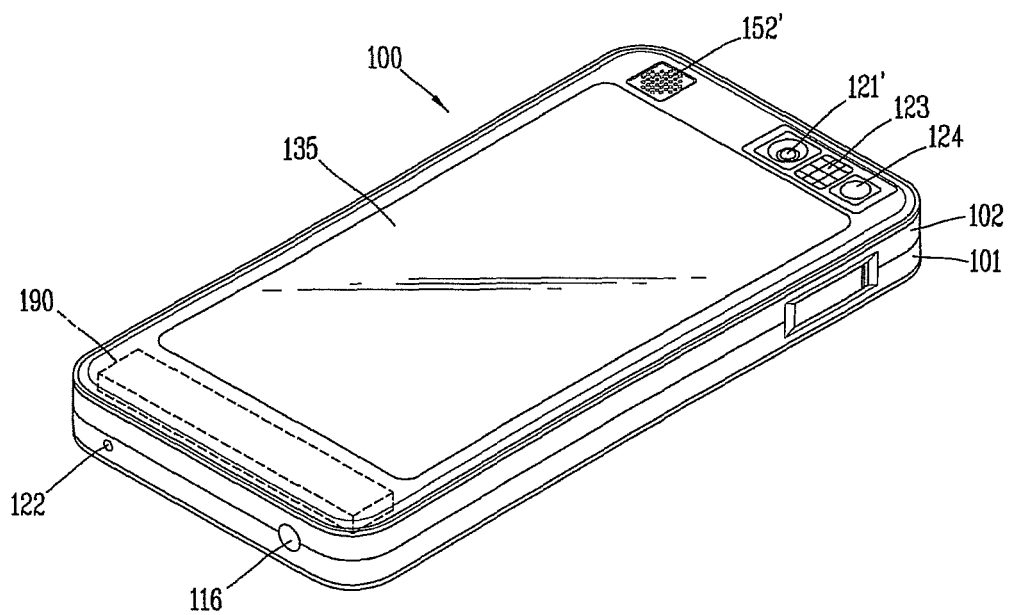

FIGS. 2A and 2B are views showing appearance of the mobile terminal 100. More specifically, FIG. 2A illustrates a front surface and one side surface of the mobile terminal 100. FIG. 2B illustrates a rear surface and another side surface of the mobile terminal 100.

As shown in FIG. 2A, the mobile terminal 100 may be a bar type mobile terminal. However, embodiments are not limited to this configuration, but may be applied to a slide type in which two or more bodies are coupled to each other so as to perform a relative motion, a folder type, or a swing type, a swivel type and/or the like.

A case (casing, housing, cover, etc.) forming an appearance of a terminal body may include a front case 101 and a rear case 102. A space formed by the front case 101 and the rear case 102 may accommodate various components therein. At least one intermediate case may be further disposed between the front case 101 and the rear case 102.

Such cases may be formed by injection-molded synthetic resin, and/or may be formed using a metallic material such as stainless steel (STS) or titanium (Ti).

At the front case 101, the display unit 151, the audio output module 152, the camera 121, the user input unit 130, the microphone 122, the interface unit 170, etc. may be provided.

The display unit 151 may occupy most of a main surface of the front case 101. The audio output module 152 and the camera 121 may be arranged at a region adjacent to one end of the display unit 151, and the user input unit 131 and the microphone 122 may be arranged at a region adjacent to another end of the display unit 151. The user input unit 132 and the interface unit 170 may be arranged on side surfaces of the front case 101 and the rear case 102.

The user input unit 130 may be manipulated to receive a command for controlling an operation of the mobile terminal 100. The user input 130 may include a plurality of manipulation units 131 and 132.

The manipulation units 131 and 132 may receive various commands. For example, the first manipulation 131 may be configured to input commands such as START, END, SCROLL or the like. The second manipulation unit 132 may be configured to input commands for controlling a level of sound outputted from the audio output module 152, or commands for converting a current mode of the display unit 151 to a touch recognition mode.

FIG. 2B shows that a camera 121' may be additionally provided on the rear case 102. The camera 121' may face a direction that is opposite to a direction faced by the camera 121 (to FIG. 2A), and/or may have different pixels from those of the camera 121.

For example, the camera 121 may operate with relatively lower pixels (lower resolution), whereas the camera 121' may operate with a relatively higher pixels (higher resolution). Thus, the camera 121 may be useful when a user may capture his face and send it to another party during a video call or the like. This may reduce a size of transmission data. On the other hand, the camera 121' may be used to store images of a high picture quality.

The cameras 121 and 121' may be installed at the terminal body so as to rotate or pop-up.

A flash 123 and a mirror 124 may be additionally provided close to the camera 121'. The flash 123 may operate in conjunction with the camera 121' when taking a picture using the camera 121'. The mirror 124 can cooperate with the camera 121' to allow a user to photograph himself in a self-portrait mode.

An audio output module 152' may be additionally arranged on a rear surface of the terminal body. The audio output module 152' may cooperate with the audio output module 152 so as to implement a stereo function. The audio output module 152' may be configured to operate as a speakerphone during a call.

A broadcast signal receiving antenna 116 as well as an antenna for calling may be additionally provided on a side surface of the terminal body. The broadcast signal receiving antenna 116 of the broadcast receiving module 111 may be configured to retract into the terminal body.

The power supply unit 190 for supplying power to the mobile terminal 100 may be mounted to the terminal body. The power supply unit 190 may be mounted in the terminal body, or may be detachably mounted to the terminal body.

A touch pad 135 for sensing a touch may be additionally mounted to the rear case 102. Like the display unit 151, the touch pad 135 may be formed to be light-transmissive. The touch pad 135 may be also additionally mounted with a rear display unit for outputting visual information. Information output from the display unit 151 (front display) and the rear display can be controlled by the touch pad 135.

The touch pad 135 may operate in association with the display unit 151. The touch pad 135 may be disposed on the rear surface of the display unit 151 in parallel. The touch pad 135 may have a size equal to or smaller than the display unit 151.

The mobile terminal 100 and a user interface (UI) according to an example embodiment may now be explained in more detail. The UI may be used to connect the mobile terminal 100 to an external device, and the UI may be used to share contents with the external device.

Figure 3:
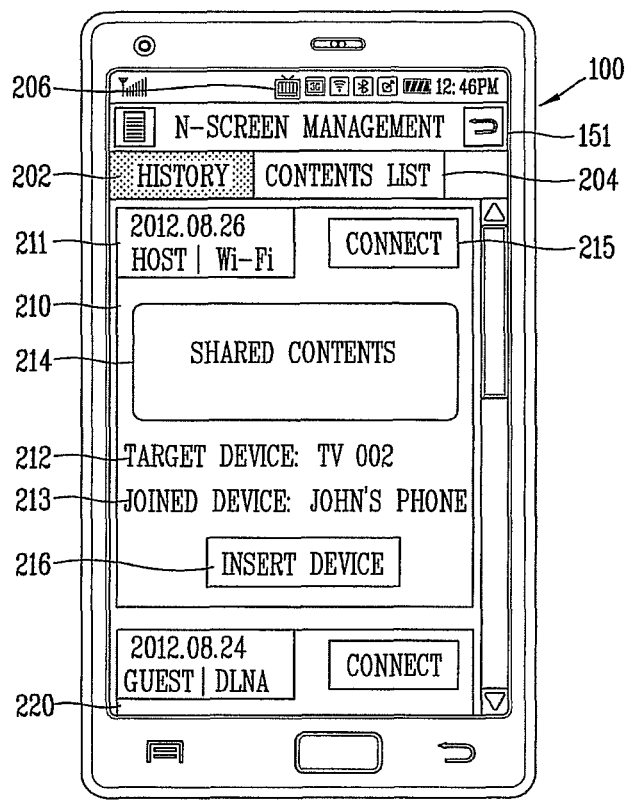
FIG. 3 is a view showing a user interface (UI) of a mobile terminal according to an example embodiment of the present invention.

FIG. 3 is a view showing a user interface (UI) of the mobile terminal 100 according to an example embodiment of the present invention. FIG. 3 is an example of an execution screen image with respect to a management application for managing contents sharing between the mobile terminal 100 (or electronic device) and a plurality of external devices.

In a contents sharing system to which N screen technology is applied, the external device may include a target device and/or a joined device. The target device may be a device that shares contents with the mobile terminal 100 (or electronic device) by being connected to the mobile terminal 100. The joined device may be a device that receives contents shared between the mobile terminal 100 and the target device by being connected to the target device, without being connected to the mobile terminal 100.

As one example, a host (such as a mobile terminal) may provide content to a first target (such as a television) and to a second target (such as a mobile terminal).

In another example, a host (such as a mobile terminal) may provide content to a target (such as a television) and the target may communicate with a mobile terminal. In this example, a joined device (another electronic device) may communicate with the mobile terminal. The joined device may also receive content from the target (such as the television) without receiving the content from the mobile terminal.

As used herein, being connected refers to being wirelessly connected and/or physically connected.

A user interface of the management application may include a first control menu 202 (or button) for displaying a sharing history list (or sharing item list), a second control menu 204 (or button) for displaying a list of contents to be shared, and an indicator 206 for indicating a connection state between the mobile terminal 100 and an external device.

The indicator 206 may be displayed based on a connection state between the mobile terminal 100 and the external device. Even though the management application is not being executed, the indicator 206 may be displayed on a specific region of a screen (e.g., an upper end of the screen) together with another indicator that indicates a state of the mobile terminal 100. Graphic information of the indicator 206 may be controlled according to a stability degree of data communication between the mobile terminal 100 and the external device. For example, if data communication is in an unstable state, then a color of the indicator 206 may be changed. The indicator 206 may be changed in other ways to represent a different state of data communication.

An application icon having a function of the indicator 206 may also be displayed on a home screen. Under such configuration, the application icon may be displayed or emphasized according to a connection state between the mobile terminal 100 and the external device, similar to the indicator 206. Upon detection of a touch input with respect to the application icon, the home screen may be converted (or changed) into an execution screen for the management application.

While the management application is being executed, the controller 180 may control the display unit 151 to display a sharing history list that includes a plurality of shared list items 210 and 220 (or shared history items), in response to receiving a touch input with respect to the first control menu 202. The sharing list items 210 and 220 may identify (or indicate) history information on a contents sharing event between the mobile terminal 100 (or electronic device) and the external device. The shared list items 210 and 220 may include at least one of connection environment information 211, target device information 212 of a target device, joined device information 213 of a joined device, shared contents summary information 214, a first menu button 215 to input a device connection command, and a second menu button 216 to add additional devices.

The shared contents summary information 214 may include thumbnail images or graphical images, for example.

The connection environment information 211 may include a date and time when a contents sharing event has occurred, an applied communication standard technology (e.g., Wi-Fi, DLNA, Bluetooth, NFC, etc.), a control authority with respect to the mobile terminal 100, etc. The control authority of the mobile terminal 100 may be categorized as a host authority (i.e., the mobile terminal 100) and/or a guest authority (i.e., another mobile terminal). For example, if the mobile terminal 100 is endowed as a host authority, the mobile terminal 100 may perform functions in an independent manner. These functions may include providing and playing contents to be shared. On the other hand, if the mobile terminal 100 is endowed as a guest authority, the mobile terminal 100 may share contents with an external device in a dependent manner on a control command of another device (such as a mobile terminal) having the host authority.

The target device information 212 and the joined device information 213 may include device identification information such as a device name and/or an identification number. The target device information 212 may include a called number (for a mobile terminal) or information of a television, for example. The shared contents summary information 214 may include a title, a capacity, a type (e.g., photo, film, document, etc.), a representative image, etc. of shared contents. The shared contents summary information 214 may include thumbnail images or graphical images, for example.

Upon detection of a touch input with respect to the first menu button 215, the mobile terminal 100 and the target device may be connected to each other. The connection may be a wireless connection, for example. At a same time, contents shared among the mobile terminal 100, the target device and/or the joined device may be played and output (such as being displayed). An authentication procedure, a communication environment setting, etc. required to execute a device connection may be automatically performed. In an example where a shared state of contents is released, the contents may be shared among the mobile terminal 100 (or electronic device), the target device and/or the joined device, in response to a device connection command that is input with respect to the first menu button 215.

Upon detection of a touch input with respect to the second menu button 216, a device list of connectable peripheral devices may be displayed. In an example where one of a plurality of addresses displayed on an address list is selected based on a touch input with respect to the second menu button 216, a device list registered to the selected address may be displayed. In an example where address information is displayed as the joined device information 213, a list of devices registered to a corresponding address may be displayed based on a touch input with respect to the address information. A device selected from the displayed device list may be added to or replaced by the target device or the joined device.

Figure 4:
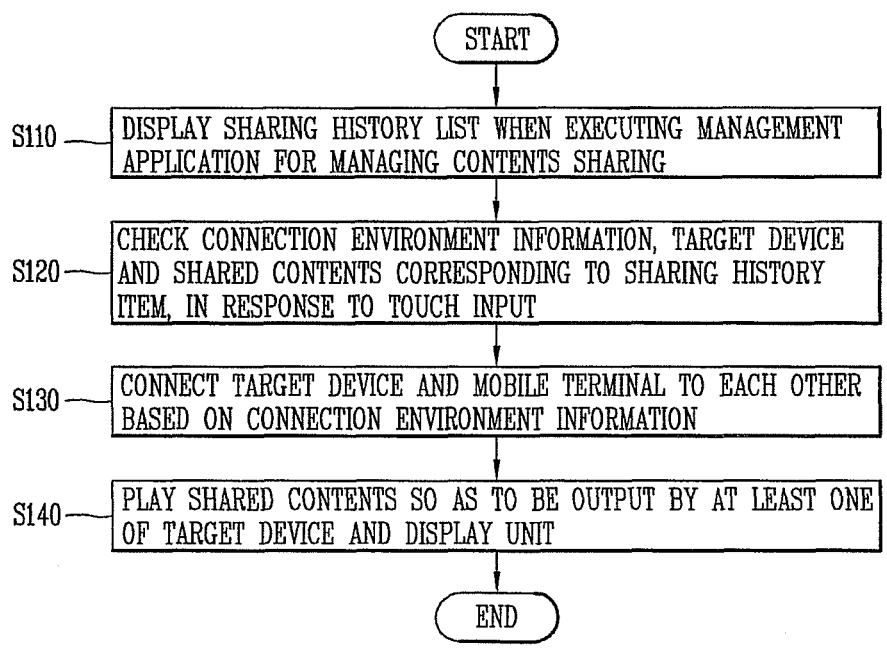
FIG. 4 is a flowchart of a method for controlling a mobile terminal according to an example embodiment of the present invention.

FIG. 4 is a flowchart of a method for controlling the mobile terminal 100 according to an example embodiment of the present invention. Other embodiments and operations may also be provided.

Referring to FIG. 4, while a management application is being executed (on an electronic device such as a mobile terminal or host, a sharing history list including a plurality of sharing history items may be displayed (S110). The plurality of sharing history items may be sorted (or provided in a specific order) according to at least one of connection environment information and/or a type of shared contents. For example, a sharing history item corresponding to a recently-occurred sharing event may be initially displayed. Additionally, a photo, a moving image, a text, etc. may be displayed in a differentiated manner from each other.

Connection environment information, a target device and shared contents, each corresponding to sharing history items on a sharing history list, may be checked (or determined) in response to a touch input with respect to the sharing history items (S120).

The target device and the mobile terminal 100 may be connected to each other based on the connection environment information (S130). The shared contents may be played so as to be output by at least one of the target device and/or the display unit 151 of the mobile terminal 100 (S140). The shared contents being played may include providing an audio output and/or a video output.

The shared contents may be stored in at least one of the mobile terminal 100 and/or the target device. If the shared contents stored in the mobile terminal 100 is played, data corresponding to the played shared contents may be transmitted from the mobile terminal 100 to the target device. The data may then be output (such as displayed) from the target device. On the other hand, if the shared contents is stored in both the mobile terminal 100 and the target device, the target device may play the shared contents (contents stored in the mobile terminal 100 and the target device) in response to a control command of the mobile terminal 100.

Connection between the mobile terminal 100 and an external device, and playing shared contents may be performed based on history information of contents sharing between the mobile terminal 100 and the external device. Under such configuration, if contents sharing is performed in a same condition as a previous condition, complicated sharing environment settings may be omitted. As a result, a user's convenience may be enhanced.

In at least one example, the history items may be modified by inserting or changing the information related to the target device. Two different histories may be combined into one history (or history item list). The combined history (or combined history item list) may be sent to another mobile terminal.

Figure 5:
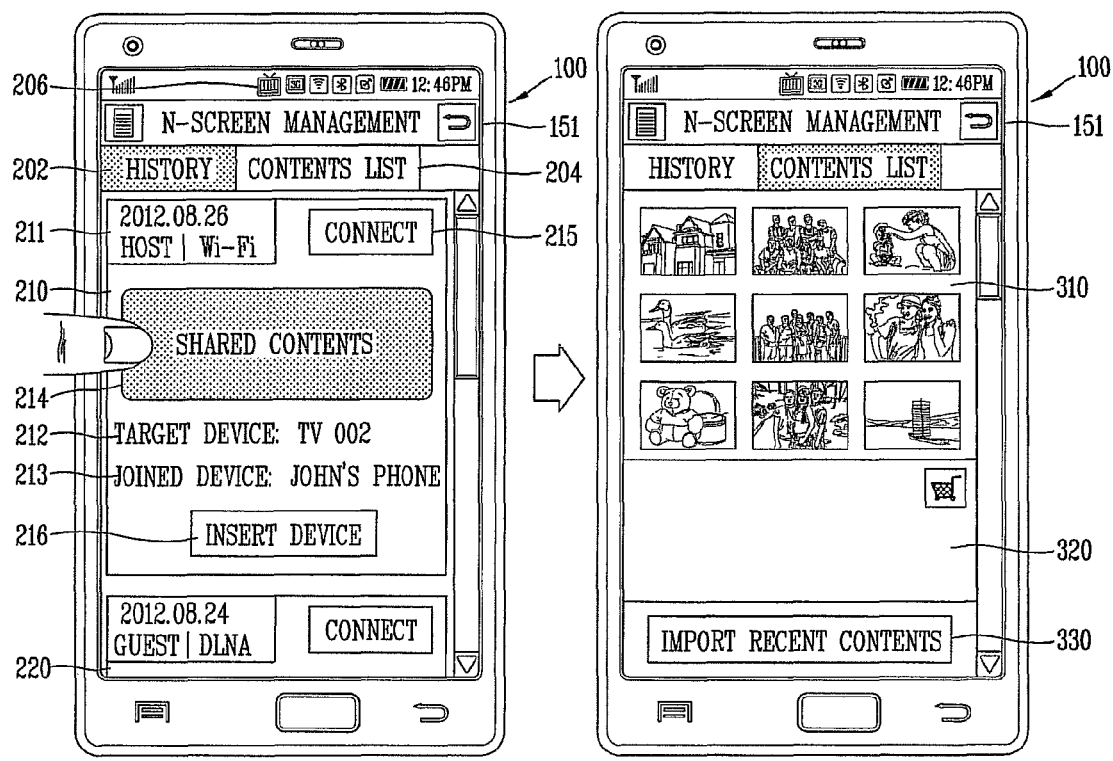
FIGS. 5 and 6 are views showing a user interface (UI) associated with a contents list according to example embodiments of the present invention.
Figure 6:
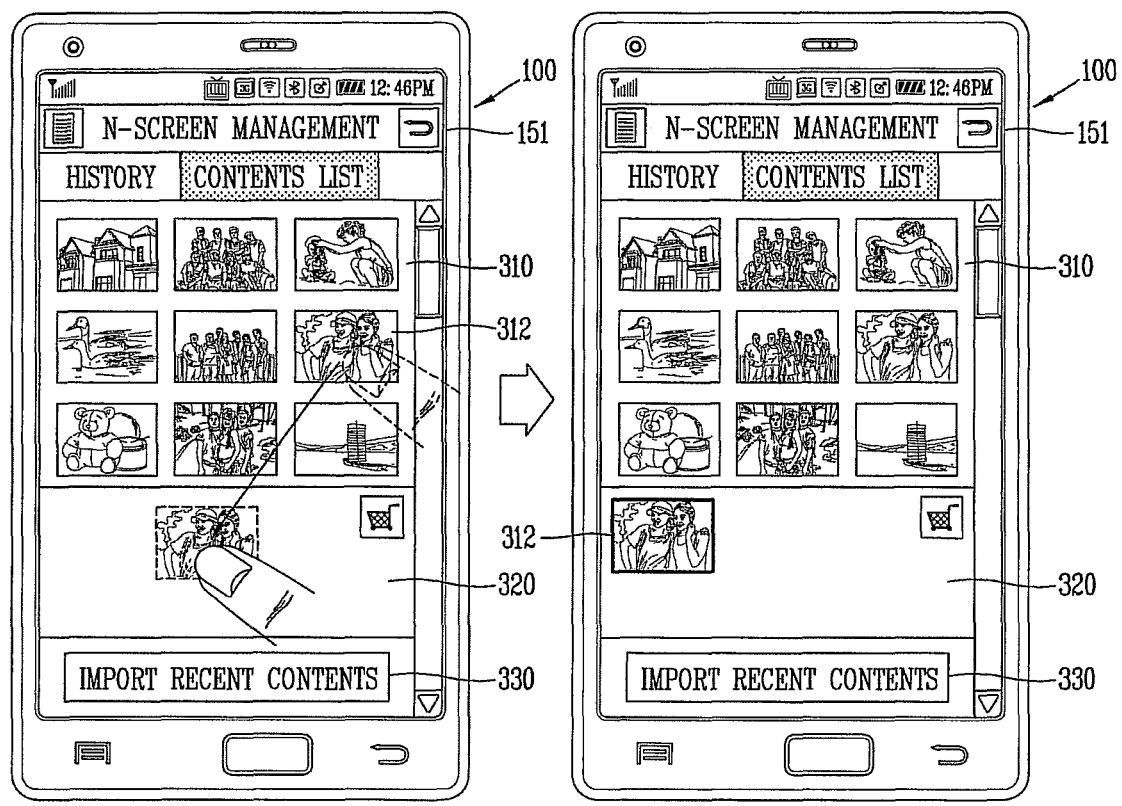

FIGS. 5 and 6 are views showing a user interface (UI) associated with a contents list according to example embodiments of the present invention. Other embodiments and views may also be provided.

Referring to FIGS. 5 and 6, the controller 180 may control the display unit 151 to display a screen image for selecting contents to be shared, from a sharing list item 210 (or sharing history list), in response to a touch input with respect to the shared contents summary information 214 that is selected from the sharing item list 210. For example, the screen image for selecting contents to be shared may include a contents list 310, a receiving object 320, a menu button 330, etc. The contents list 310 may include a plurality of contents items implemented as thumbnail images of corresponding contents. The receiving object 320 may be an area onto which the contents item may be dragged. The menu button 330 may be for displaying recently-used contents, etc. The screen image may be displayed in response to receiving a touch input with respect to the second control menu 204.

As shown in FIG. 6, upon detection of a gesture for dragging a single contents item 312 from the contents list 310 onto the receiving object 320, the controller 180 may select contents corresponding to the contents item 312, as contents to be shared. The controller 180 may control the display unit 151 to display the contents item 312 on the receiving object 320. The selected contents may be added to the sharing history item 210, and/or may be replaced by already-shared contents. The added or changed contents may be shared among the mobile terminal 100 (or electronic device), the target device and the joined device.

Figure 7A:
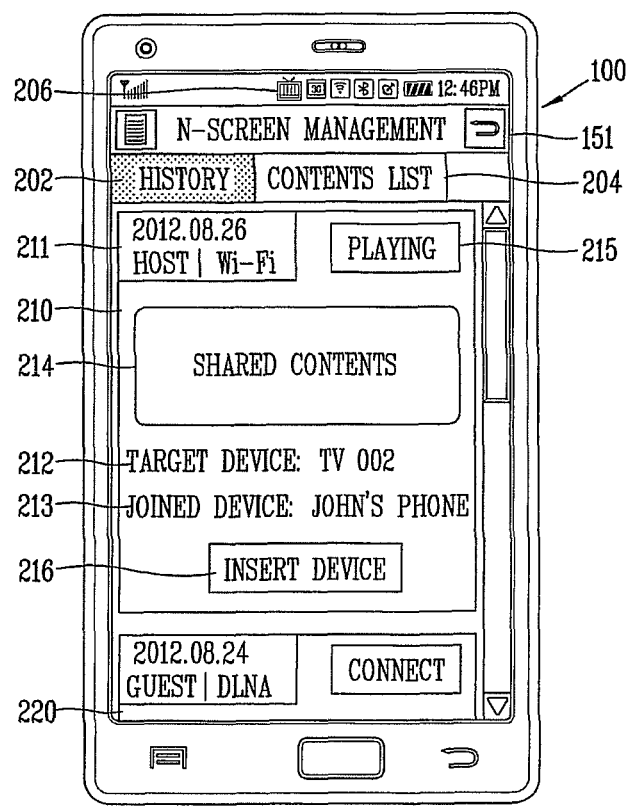
FIGS. 7A and 7B are views showing a user interface (UI) associated with a sharing state display according to example embodiments of the present invention.
Figure 7B:
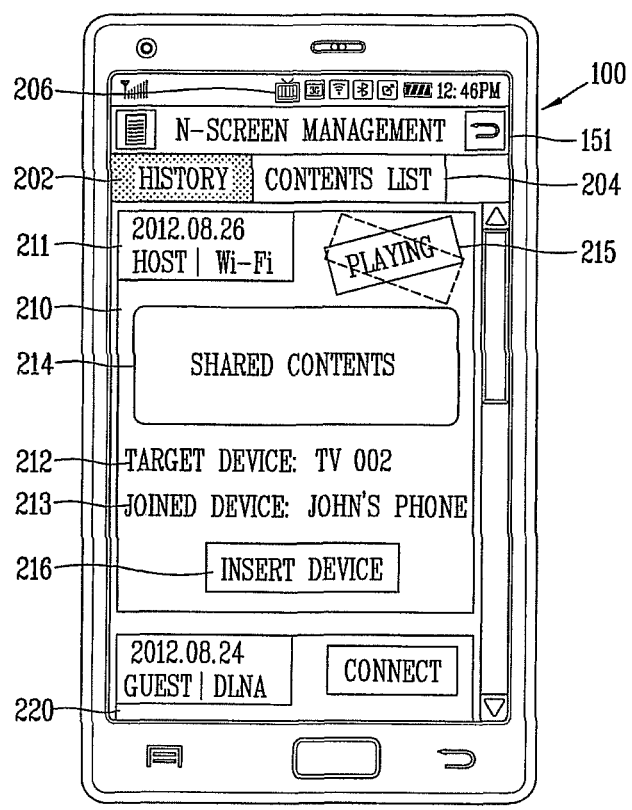

FIGS. 7A and 7B are views showing a user interface (UI) associated with sharing state display according to example embodiments of the present invention. Other embodiments and views may also be provided.

Referring to FIGS. 7A and 7B, the first menu button 215 may display, on the shared list item 210, a state associated with contents sharing. More specifically, the controller 180 may control button display information that indicates the first menu button 215 based on whether shared contents has been played, and based on a device connection state when shared contents is played.

For example, as shown in FIG. 7A, text information displayed on the first menu button 215 may change from "CONNECT" to "PLAYING," in order to inform that shared contents is being played as the mobile terminal 100 and the target device are connected to each other.

In an example where a stability degree of data communication, a device connection state is lowered to a value less than a reference value at the time of playing shared contents, the first menu button 215 may appear to shake or flicker as its color becomes lighter as shown in FIG. 7B. In other words, the first menu button 215 may appear to move on the screen. The quality of signal connection may be shown by the first menu button 215.

Figure 8:
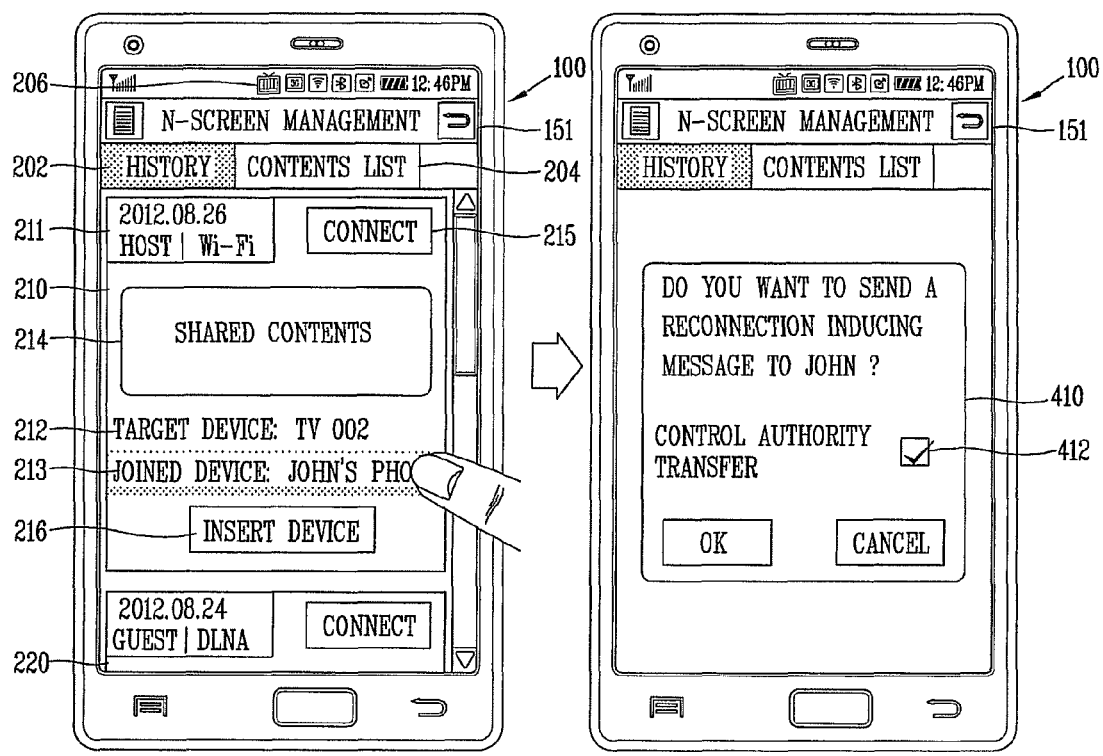
FIG. 8 is a view showing a user interface (UI) associated with a message transmission according to an example embodiment of the present invention.
Figure 9:
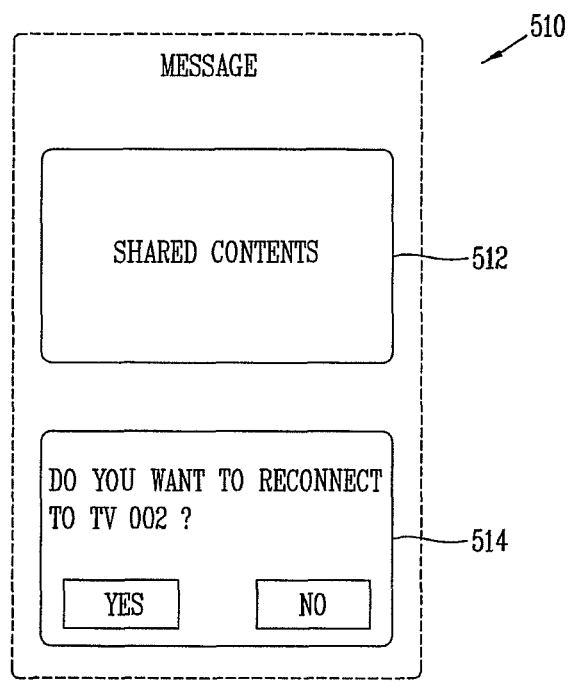
FIG. 9 is a view showing the message of FIG. 8.

FIG. 8 is a view showing a user interface (UI) associated with a message transmission according to an example embodiment of the present invention. FIG. 9 is a view showing the message of FIG. 8. Other embodiments and views may also be provided.

If a joined device is not connected to a target device, the controller 180 may transmit a reconnection inducing message to the joined device.

If the joined device is not connected to the target device (i.e., if the joined device is not joining contents sharing), then the controller 180 may change the joined device information 213. For example, the joined device information 213 may change in color, brightness, font, etc.

Upon detection of a touch input with respect to the joined device information 213, the controller 180 may control the display unit 151 to display a transmission menu 410 for transmitting the reconnection inducing message. As shown in FIG. 8, the transmission menu 410 may include a check box 412 for selecting whether to transmit a control authority endowed to the mobile terminal 100 (or electronic device) to the joined device, and/or a message, such as "Do you want to send a reconnection inducing message to John?". This may allow a joined person to control playback of content (such as stop, play, fast forward, reverse).

As one example, the joined device (i.e., John's phone) may need to notify the user (i.e., John) whether he wants to reconnect for shared comment because the user (or the user's terminal) may be performing something else on the joined device.

As shown in FIG. 9, the controller 180 may send a reconnection inducing message 510 to the joined device, according to manipulation of the transmission menu 410. The reconnection inducing message 510 may include a representative image 512 of shared contents, and a selection menu 514 for selecting whether to perform reconnection (or not). The representative image 512 of shared contents may indicate an image when the joined device and the target device have been completely connected to each other. Once a reconnection command is input to the joined device according to manipulation of the selection menu 514, the joined device may connect to the target device to thus consecutively output shared contents from a disconnected part. For example, the reconnection inducing message 510 shown in FIG. 9 may correspond to the message at John's phone.

Figure 10:
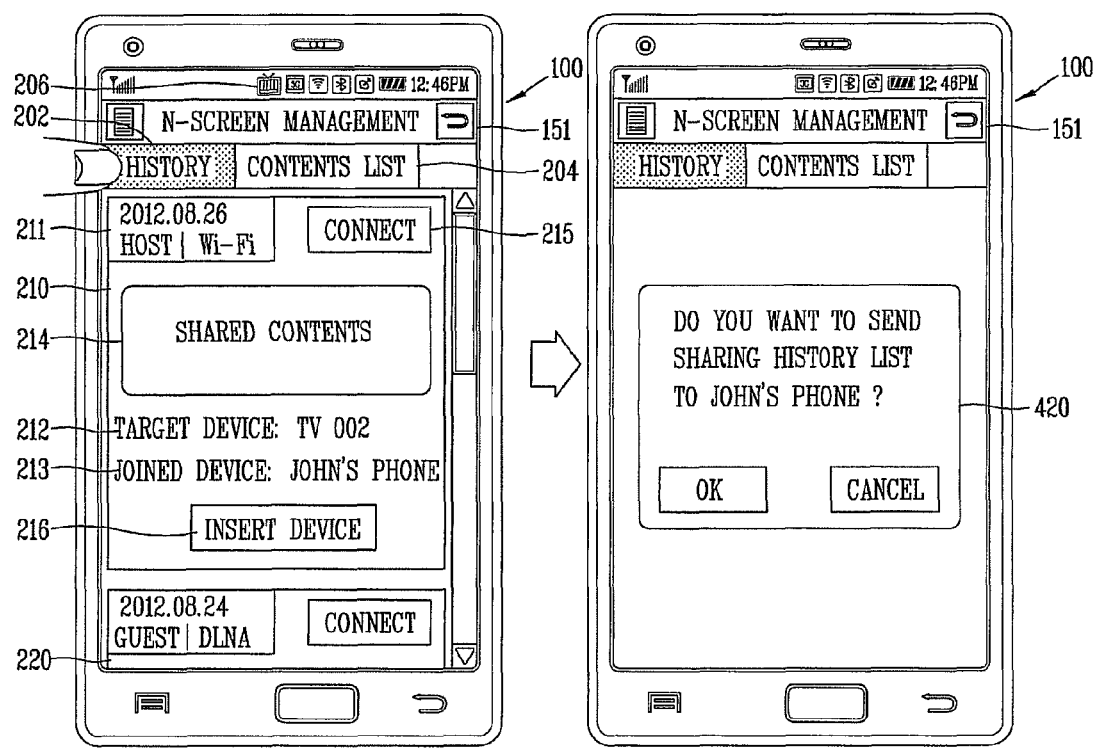
FIG. 10 is a view showing a user interface (UI) associated with transmission of a sharing history list according to an example embodiment of the present invention.

FIG. 10 is a view showing a user interface (UI) associated with transmission of a sharing history list according to an example embodiment of the present invention. FIG. 10 illustrates an example to send a sharing history list to the joined device. Other embodiments and views may also be provided.

Upon detection of a touch input with respect to the first control menu 202 (e.g., a long-touch gesture input), the controller 180 may control the display unit 151 to display a transmission menu 420 for sending a sharing history list (or a selected history). For example, the transmission menu 420 may include a message, such as "Do you want to send a sharing history list to John's phone?". Once a send command is input to the mobile terminal 100 according to manipulation of the transmission menu 420, the controller 180 may send, to the joined device, a message that includes at least one or more information from the sharing history list. For example, only the target device information 212, rather than the shared contents summary information 214, may be sent to the joined device through a message.

The information to be sent through a message may be determined based on a user's input. The joined device may be another mobile terminal corresponding to an address stored in the mobile terminal 100.

The other mobile terminal may display a message received from the mobile terminal 100. Upon detection of a touch input with respect to the displayed message in a state where no management application has been installed at the mobile terminal, the other mobile terminal may download a management application from an application providing server. This may be implemented by a pop-up menu that inquires a user whether to install a management application (or not).

The mobile terminal 100 may receive, from an external device such as another mobile terminal, a sharing history list that is different from the existing sharing history list stored in the memory 160. The sharing history list may be received through the wireless communication unit 110. The controller 180 may update the sharing history list stored in the memory 160 by using the received sharing history list.

In at least one example, a selected history may be sent to the joined device (such as a mobile terminal). This history may be sent to a terminal of a user who is not familiar with N-screen technology, so the user does not need to reconfigure their terminal.

Figure 11:
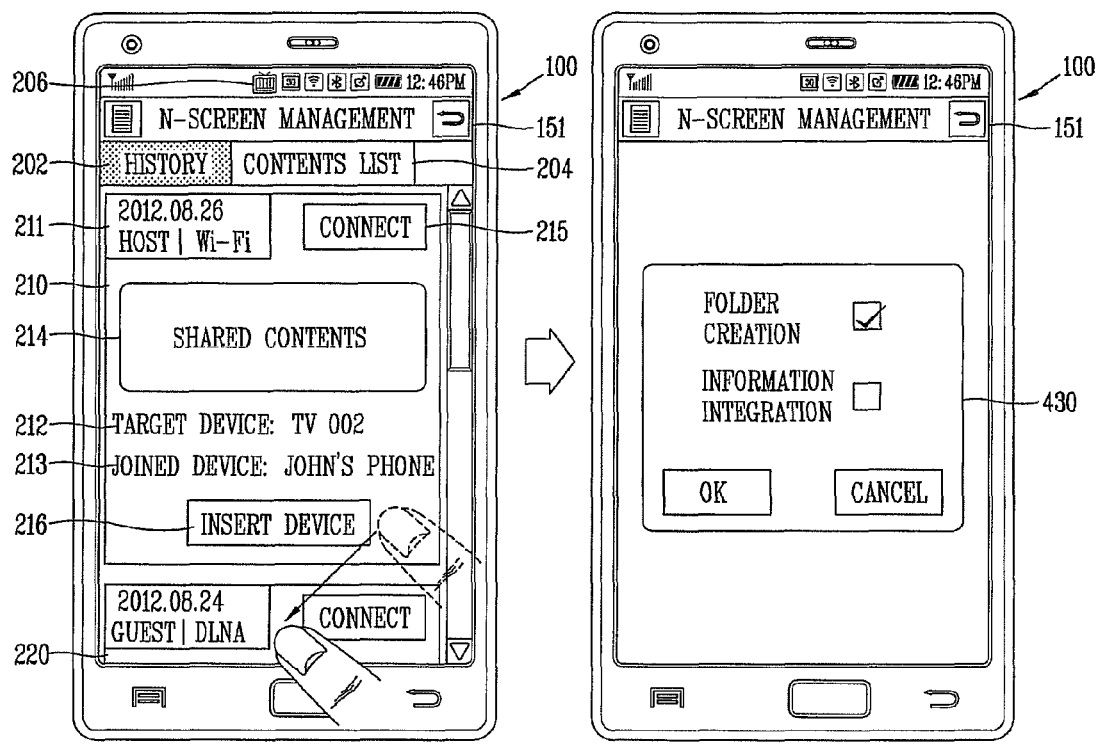
FIG. 11 is a view showing a user interface (UI) associated with control of a sharing history item according to an example embodiment of the present invention.

FIG. 11 is a view showing a user interface (UI) associated with control of sharing history items according to an example embodiment of the present invention. FIG. 11 illustrates an example to change a layout of sharing history items. Other embodiments and views may also be provided.

The controller 180 may overlap a first sharing history list 210 with a second sharing history list 220 different from the first sharing history list 210. For example, the controller 180 may partially or wholly overlap the first and second sharing history lists 210 and 220 with each other, in response to a gesture input for dragging the first sharing history item 210 and dropping the first sharing history item 210 onto the second sharing history item 220.

The controller 180 may assemble the first and second sharing history lists 210 and 220 as a group, or may integrate information on the first and second sharing history lists 210 and 220 with each other. The controller 180 may control the display unit 151 to display a selection menu 430 for selecting whether to create a folder or to integrate information on the first and second sharing history lists 210 and 220 with each other.

Once a folder creating command is input according to manipulation of the selection menu 430, the controller 180 may create a folder, and store the created first and second sharing history lists 210 and 220 in the created folder. Once an information integrating command is input according to manipulation of the selection menu 430, the controller 180 may correct at least one of the first and second sharing history lists 210 and 220, by integrating (or combining) information on the first and second sharing history lists 210 and 220 with each other. The controller 180 may create a new item that includes the integrated information.

As one example, histories may be combined to make a new N-screen configuration. For example, on August 26, History A may be that the joined person was John, and on August 24, History B may be that the joined person was Sam. These histories may be combined to a new configuration where the joined people are John and Sam. The most recent History A may be used as a priority (e.g. August 26 is based on WiFi and History B may be based on DLNA so the new configuration will be WiFi).

Figure 12A:
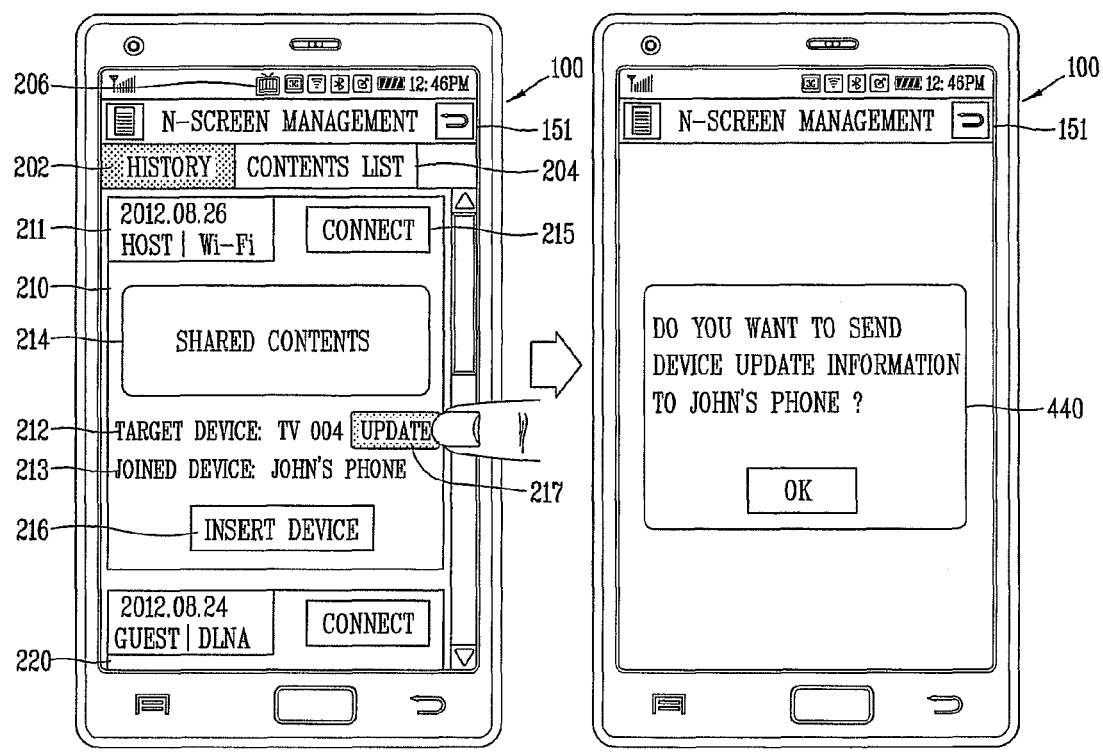
FIGS. 12A and 12B are views showing a user interface (UI) associated with information update according to example embodiments of the present invention.
Figure 12B:
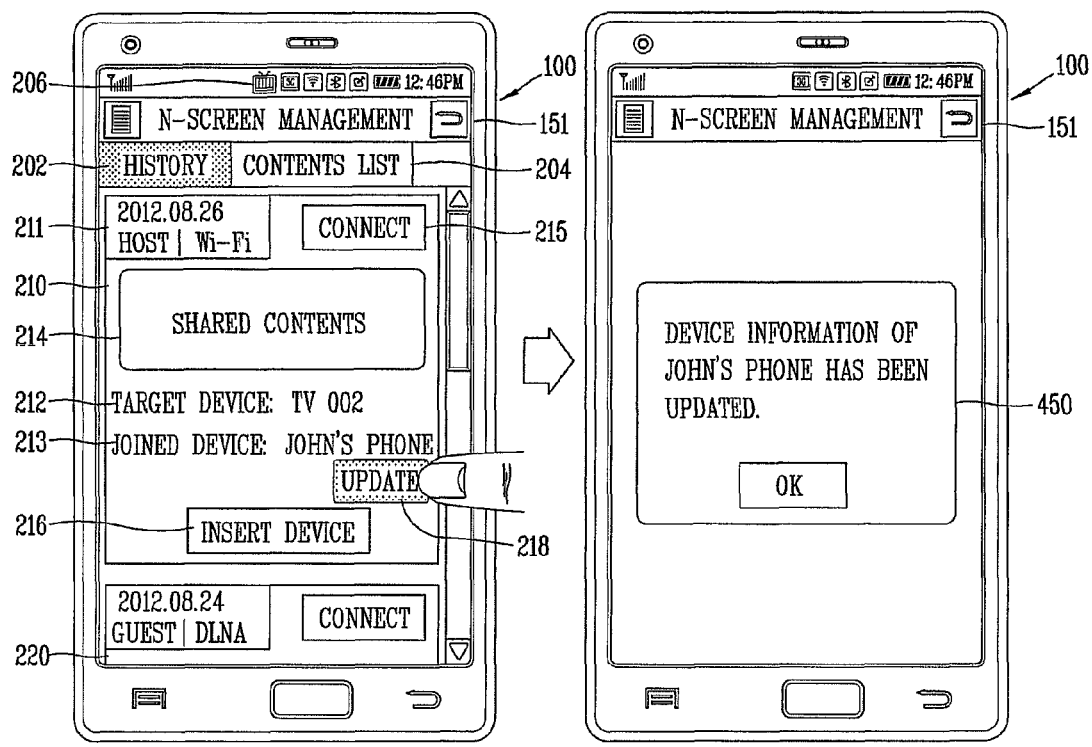

FIGS. 12A and 12B are views showing a user interface (UI) associated with information update according to example embodiments of the present invention. Other embodiments and views may also be provided.

Referring to FIG. 12A, if the target device is changed to another target device (e.g., if "TV002" is changed into "TV004)", the controller 180 may create device update information. The controller 180 may control the display unit 151 to display notification information 217 informing that the target device has been changed.

Upon detection of a touch input with respect to the notification information 217, the controller 180 may control the display unit 151 to display a pop-up menu 440 for sending device update information to the joined device. For example, the pop-up menu 400 may include a message, such as "Do you want to send device update information to John's phone?". Once a send command is input to the mobile terminal 100 according to manipulation of the pop-up menu 440, the controller 180 may send device update information to the joined device.

As one example, if on August 26 one device was the host and if on August 24 the one device was the guest, then in a new configuration, the one device may be the host.

Referring to FIG. 12B, if at least part of joined device information is changed (e.g., if a phone number of "JOHN'S PHONE" is changed), the controller 180 may control the display unit 151 to display notification information 218 that indicates that the joined device information needs to be updated.

Upon detection of a touch input with respect to the notification information 218, the controller 180 may receive the changed information from the joined device. The controller 180 may then update the joined device information based on the received changed information. The controller 180 may control the display unit 151 to display a message 450 that indicates that the joined device information has been updated (e.g., the message 450, such as "Device information on John's phone has been updated").

An aspect of the detailed description may be to provide a user interface (UI) capable of facilitating connection and contents sharing between a mobile terminal and a plurality of external devices.

A mobile terminal may be configured to interwork with a plurality of external devices. The mobile terminal may include: a display unit configured to display a sharing history list, when executing a management application for managing contents sharing between the mobile terminal and the external devices. A controller may be configured to check connection environment information, a target device, and shared contents each corresponding to sharing history items on the sharing history list, in response to a user input with respect to the sharing history items. The controller may also be configured to connect the target device and the mobile terminal to each other based on the connection environment information. The controller may be configured to play the shared contents such that the shared contents is output by at least one of the target device and the display unit.

The sharing history items may include at least one of the connection environment information, shared contents summary information, target device information, joined device information, a first menu button for inputting a device connection command, and a second menu button for addition of devices.

The controller may be configured to control the display unit to display a contents list, in response to a touch input with respect to the shared contents summary information. The controller may be configured to change the shared contents into contents selected from the contents list.

The controller may be configured to control button display information indicating the first menu button, based on whether the shared contents has been played, and based on a connection state between the mobile terminal and the external device when the shared contents has been played.

The controller may be configured to sort the plurality of sharing history items from the sharing history list, according to at least one of the connection environment information and a type of the shared contents.

If the joined device is not connected to the target device, the controller may transmit a reconnection inducing message to the joined device.

The controller may be configured to transmit, to another mobile terminal, a message that includes at least partial information of the sharing history list. Upon detection of a touch input with respect to the message including the at least partial information in a state where the management application has not been installed at the other mobile terminal, the other mobile terminal may install the management application.

If a sharing history list different from the sharing history list is received from another mobile terminal, the controller may update the original sharing history list based on the received sharing history list.

If the target device is changed into another target device, the controller may create device update information based on the other target device, and the controller may transmit the device update information to the joined device.

If at least part of the joined device information is changed, the controller may control the display unit to display notification information indicating that the joined device information needs to be updated. The controller may be configured to receive changed information from the joined device, in response to a touch input with respect to the notification information, and the controller may be configured to update the joined device information based on the changed information.

If first and second sharing history items different from each other overlap each other in response to a touch input with respect to the sharing history list, the controller may assemble the first and second sharing history lists as a group, or the controller may integrate information on the first and second sharing history lists with each other.

A method may be provided for controlling a mobile terminal having a display unit, and interworking with a plurality of external devices. The method may include: displaying a sharing history list when executing a management application for managing contents sharing between the mobile terminal and the plurality of external devices; checking connection environment information, a target device and shared contents each corresponding to sharing history items on the sharing history list, in response to a touch input with respect to the sharing history items; connecting the target device and the mobile terminal to each other based on the connection environment information; and playing the shared contents so as to be output by at least one of the target device and the display unit.

In displaying the sharing history list, the sharing history items may include at least one of the connection environment information, shared contents summary information, target device information, joined device information, a first menu button for inputting a device connection command, and a second menu button for addition of devices.

The method may further include: displaying a contents list in response to a touch input with respect to the shared contents summary information; and changing the shared contents into contents selected from the contents list.

The method may further include controlling button display information indicating the first menu button, based on whether the shared contents has been played, and based on a connection state between the mobile terminal and the external device when the shared contents has been played.

The method may further include sorting the plurality of sharing history items on the sharing history list according to at least one of the connection environment information and a type of the shared contents.

The method may further include transmitting a reconnection inducing message to the joined device, if the joined device is not connected to the target device.

The method may further include transmitting, to another mobile terminal, a message including at least partial information of the sharing history list. Upon detection of a touch input with respect to the message including at least partial information in a state where the management application has not been installed at the other mobile terminal, the other mobile terminal may install the management application.

The method may further include updating the sharing history list based on a sharing history list received from the other mobile terminal and different from the sharing history list.

The method may further include: if the target device is changed into another target device, creating device update information based on the other target device; and transmitting the device update information to the joined device.

The method may further include: displaying notification information indicating that the joined device information needs to be updated, if at least part of the joined device information is changed.

The method may further include: receiving the changed information from the joined device, in response to a touch input with respect to the notification information; and updating the joined device information based on the received changed information.

The method may further include: assembling first and second sharing history lists different from each other as a group, or integrating information on the first and second sharing history lists with each other, if the first and second sharing history lists are overlapped with each other, in response to a touch input with respect to the sharing history list.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
 a wireless communication unit;
 a display unit configured to display a sharing history list while the mobile terminal is executing a management application for managing contents sharing between the mobile terminal and at least one of a plurality of external devices, the displayed sharing history list including a plurality of sharing history items; and
 a controller configured to:
  determine, in response to a user input with respect to a sharing history item among the plurality of sharing history items, connection environment information, a target device, and shared contents corresponding to the sharing history item;
  connect with the target device based on the connection environment information in response to the user input with respect to the sharing history item; and
  transmit, via the wireless communication unit, data of the shared contents corresponding to the sharing history item to the target device and to play the shared contents on the target device when the shared contents are not already stored in the target device, and transmit, via the wireless communication unit, a control command to the target device to play the shared contents on the target device when the shared contents are already stored in the target device,
  wherein the at least one of the plurality of external devices includes a joined device being connected to the target device so as to receive the shared contents from the target device, wherein when joined device information of the joined device changes, the controller controls the display unit to display notification information that indicates that the joined device information needs to be updated, and wherein in response to receiving a touch input with respect to the notification information, the controller updates the joined device information.

2. The mobile terminal of claim 1, wherein the plurality of sharing history items include at least one of the connection environment information, shared contents summary information, target device information of the target device, joined device information of the joined device, a first menu button to input a device connection command, or a second menu button to add additional devices.

3. The mobile terminal of claim 2, wherein in response to receiving a touch input with respect to the shared contents summary information, the controller is to control the display unit to display a contents list, and the controller is to change the shared contents into contents selected from the contents list.

4. The mobile terminal of claim 2, wherein the controller is configured to display button display information of the first menu button, based at least in part on whether the shared contents has been played on the mobile terminal, and based at least in part on a connection state between the mobile terminal and the target device when the shared contents has been played on the mobile terminal.

5. The mobile terminal of claim 2, wherein the controller is configured to arrange the plurality of sharing history items displayed on the display unit based at least in part on at least one of the connection environment information and a type of the shared contents.

6. The mobile terminal of claim 2, wherein in response to a determination that the joined device is not connected to the target device, the controller to provide a reconnection inducing message to the joined device.

7. The mobile terminal of claim 2, wherein the controller transmits, to another mobile terminal, a message that includes at least partial information of the sharing history list, and
 wherein in response to receiving a touch input with respect to the message that includes the at least the partial information when the management application has not been provided at the other mobile terminal, the other mobile terminal to install the management application.

8. The mobile terminal of claim 2, wherein the controller updates the original sharing history list based on a newlyreceived sharing history list when the mobile terminal receives the new sharing history list from another mobile terminal.

9. The mobile terminal of claim 2, wherein in response to the target device changing to another target device, the controller provides device update information based on the other target device, and the controller transmits the device update information from the mobile terminal to the joined device.

10. The mobile terminal of claim 2, wherein when a first sharing history item and a second sharing history item different from each other overlap each other in response to receiving a touch input with respect to the sharing history list, the controller provides the first sharing history list and the second sharing history list as a group, or the controller combines information on the first and second sharing history lists with each other.

11. A method for controlling a mobile terminal having a display unit, the method comprising:
    displaying, on the display unit, a sharing history list while executing a management application for managing contents sharing between the mobile terminal and at least one of a plurality of external devices, the sharing history list including a plurality of sharing history items;
    receiving a user input with respect to a sharing history item among the plurality of sharing history items;
    determining, in response to the user input, connection environment information, a target device, and shared contents corresponding to the sharing history item;
    connecting, via a wireless communication unit, the mobile terminal to the target device based on the connection environment information in response to the user input with respect to the sharing history item; and
    transmitting, via the wireless communication unit, data of the shared contents corresponding to the sharing history item to the target device and to play the shared contents on the target device when the shared contents are not stored in the target device, and transmitting, via the wireless communication unit, a control command to the target device to play the shared contents on the target device when the shared contents are already stored in the target device, wherein the at least one of the plurality of external devices includes a joined device being connected to the target device so as to receive the shared contents from the target device, wherein when joined device information of the joined device changes, the display unit to display notification information that indicates that the joined device info illation needs to be updated, and wherein in response to receiving a touch input with respect to the notification information, the joined device information is updated.

12. The method of claim 11, wherein displaying the sharing history list includes displaying at least one of the connection environment information, shared contents summary information, target device information of the target device, joined device information of the joined device, a first menu button to input a device connection command, or a second menu button to add additional devices.

13. The method of claim 12, further comprising:
    receiving a touch input with respect to the shared contents summary information;
    displaying a contents list in response to receiving the touch input; and
    changing the shared contents into contents selected from the contents list.

14. The method of claim 12, further comprising displaying button display information of the first menu button, based at least in part on whether the shared contents has been played, and based at least in part on a connection state between the mobile terminal and the external devices when the shared contents has been played.

15. The method of claim 12, further comprising arranging the displayed plurality of sharing history items on the sharing history list based at least in part on at least one of the connection environment information and a type of the shared contents.

16. The method of claim 12, further comprising:
    determining that the joined device is not connected to the target device; and
    transmitting a reconnection inducing message to the joined device when the joined device is determined to not be connected to the target device.

17. The method of claim 12, further comprising transmitting, to another mobile terminal, a message that includes at least partial information of the sharing history list, and
    wherein in response to receiving a touch input with respect to the message that includes the at least partial information when the management application has not been installed at the other mobile terminal, the other mobile terminal to install the management application.

18. The method of claim 12, further comprising updating the sharing history list in the mobile terminal based on a sharing history list received from another mobile terminal.

19. The method of claim 12, further comprising:
    when the target device changes to another target device, creating device update information based on the other target device; and
    transmitting the device update information to the joined device.

20. The method of claim 12, further comprising assembling a first sharing history list and a second sharing history list different from each other as a group, or integrating information on the first sharing history list and the second sharing history list with each other when the first sharing history list overlaps the second sharing history list, in response to a touch input with respect to the sharing history list.

* * * * *